Dec. 16, 1947.                 P. E. PEARSON                 2,432,794
                        CAN SPOUT SOLDERING MACHINE
              Original Filed Dec. 5, 1938        3 Sheets—Sheet 1

Inventor
Paul E. Pearson
By Mason & Porter
Attorneys

Dec. 16, 1947.                P. E. PEARSON                2,432,794
                         CAN SPOUT SOLDERING MACHINE
                  Original Filed Dec. 5, 1938        3 Sheets-Sheet 3

Inventor

Paul E. Pearson

By  Mason & Porter
            Attorneys

Patented Dec. 16, 1947

2,432,794

UNITED STATES PATENT OFFICE 2,432,794

CAN SPOUT SOLDERING MACHINE

Paul E. Pearson, Chicago, Ill., assignor to Continental Can Company, Inc., New York, N. Y., a corporation of New York Original application December 5, 1938, Serial No. 244,085, now Patent No. 2,285,872, dated June 9, 1942. Divided and this application December 19, 1941, Serial No. 423,688

2 Claims. (Cl. 113—59)

The invention relates generally to soldering machines and primarily seeks to provide certain new and useful improvements in soldering machines particularly adapted for soldering spouts or similar protuberances on cans.

This case is a division of the co-pending application for U. S. Letters Patent, Serial No. 244,085, filed by Paul E. Pearson on December 5, 1938, now Patent 2,285,872, issued June 9, 1942, and covering certain new and useful improvements in Can spout soldering machines, namely, a solder feeder structure.

An object of the invention is to provide a support for a can having a spout applied thereto, a soldering iron spaced from the support and having provision for receiving and centering the spout, means for bringing about relative movement between the support and the iron to effectively position the iron and center the spout, and means for heating the iron.

Another object of the invention is to provide a machine of the character described embodying a novel turret structure including vertically spaced turret portions one equipped with a plurality of equidistantly spaced can supports and the other equipped with a like number of soldering irons aligned with the supports, means for indexing the turret structure to serially present the supports at a soldering station, means for bringing about relative movement between the supports and the associated irons at the soldering station for effectively presenting the irons to the cans, and means for heating the irons.

Another object of the invention is to provide a turret structure of the character stated in which the soldering iron bearing turret portion fixedly supports the irons and in which the can supports are movable toward and from the irons.

Another object of the invention is to provide a novel heating means for each soldering iron, each said means including a thermostatic control.

With the above and other objects in view that will hereinafter appear, the nature of the invention will be more clearly understood by following the detailed description, the appended claims, and the several views illustrated in the accompanying drawings.

Figure 1:
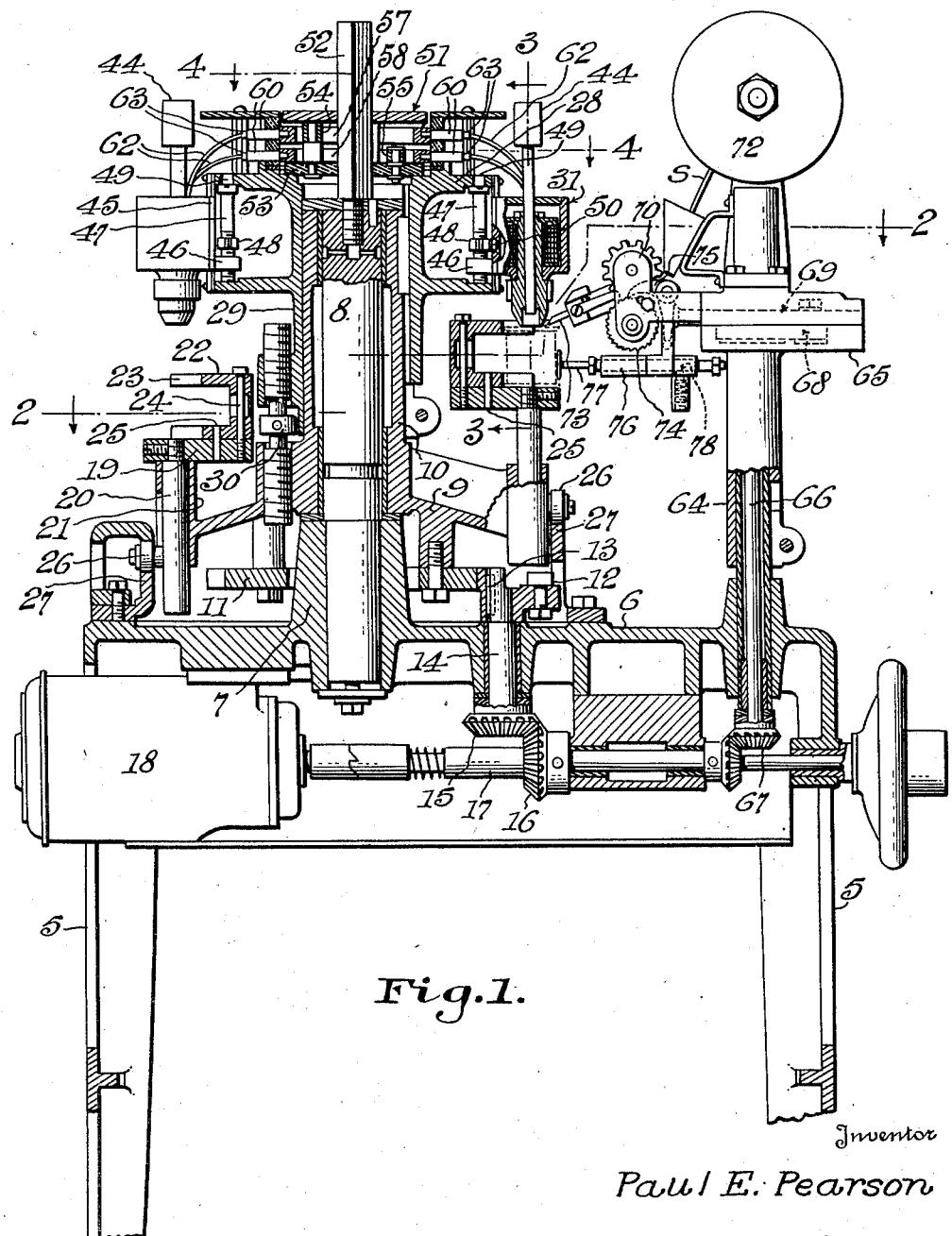
Figure 1 is a vertical section of the machine taken through the axis of the turrets and the soldering station.
Figure 2:
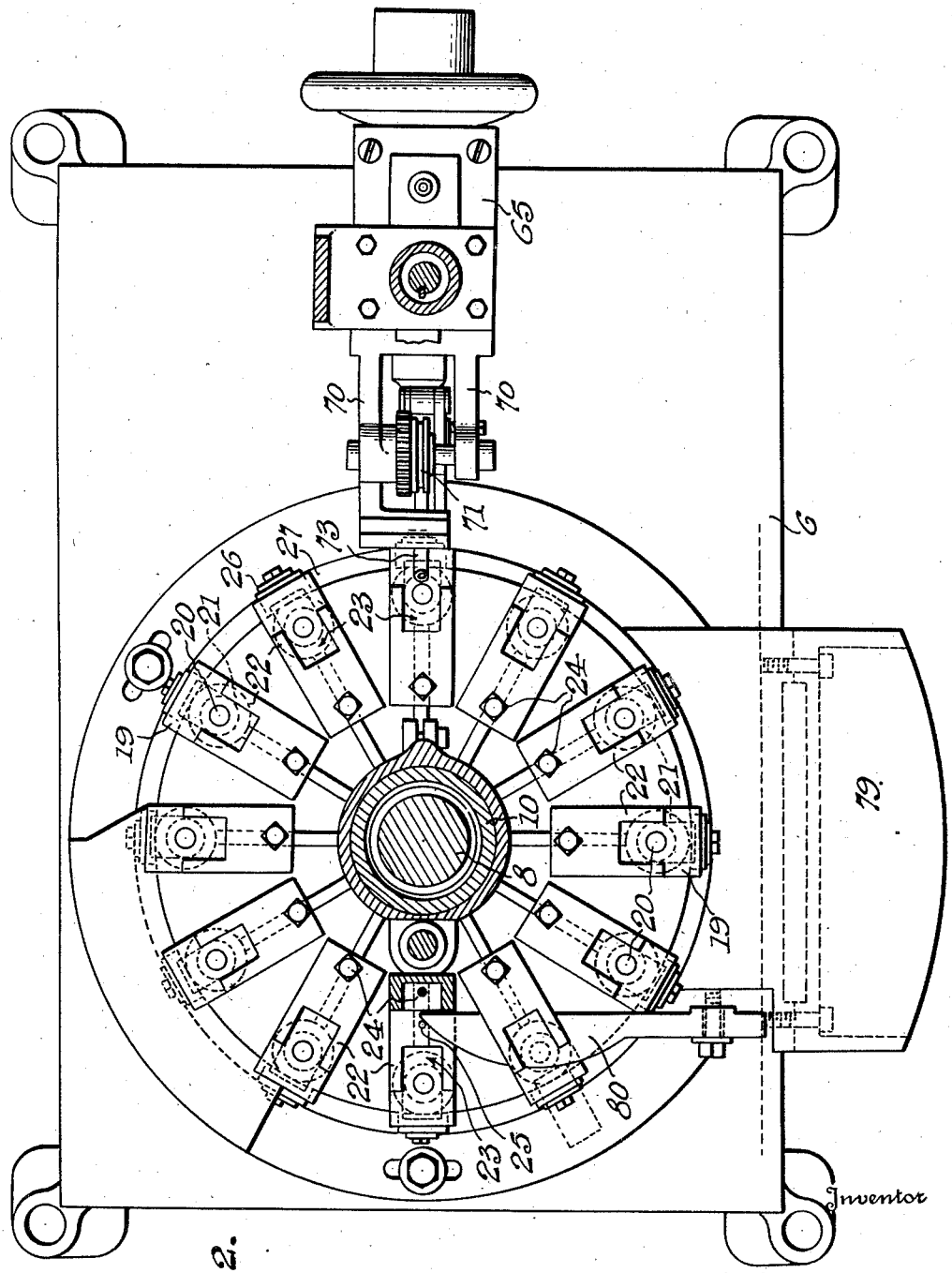
Figure 2 is a horizontal section taken on the line 2—2 on Figure 1.

The machine herein disclosed as illustrative of one practical embodiment of the invention includes a supporting frame 5 having a table top 6 formed with an upstanding bearing sleeve 7.

A shaft 8 is secured within the sleeve 7 and rotatably supports a lower turret portion 9 having an upstanding bearing sleeve 10. The turret portion 9 is indexed station by station about the shaft 8 through the medium of a Geneva gearing equipment. This equipment includes a Geneva wheel 11 actuated by a rotative advancing element 12 and lock 13, the parts 12, 13 being secured to a shaft 14 which is driven through bevel gears 15 and 16 from a main drive shaft 17 connected to a source of power such as an electric motor 18 preferably secured to the frame top 6.

The turret portion 9 is provided with a plurality of equidistantly spaced can supports, each including a base 19 mounted on a stem 20 which is vertically slidable in a bearing sleeve 21 carried by the turret portion 9. Each base 19 carries a can holding and aligning member 22 provided with upper and lower U-shaped arms which together provide can aligning recesses 23. Each aligning member 22 is secured to the base by a single long screw 24 and is restrained from angular movement about its securing screw 24 by a pin 25 recessed into the base 19.

The can supports are adapted to be raised into and lowered from can soldering position through the medium of cam follower rollers 26 which engage a cylindrical plate cam 27 having a point of maximum lift disposed in alignment with the can soldering station, and a point of minimum lift just preceding the can discharge station.

An upper turret portion 28, vertically spaced above the turret portion 9 and having a depending sleeve 29, is slidably mounted on the sleeve 10 and is splined thereto. The spaced relation of the turret portions 9 and 28 can be varied at will through the medium of a turnbuckle screw 30 disposed between the turrets and threadably engaging the respective sleeves thereof in the manner illustrated in Figure 1.

The upper turret portion 28 carries a plurality of equidistantly spaced soldering iron assemblies 31 which are disposed in vertical alignment with the can supports. Each soldering iron assembly includes a hollow casing 32 and a soldering iron 33 having a shank 34 of reduced diameter. The soldering iron is provided with a coniform nose 35 and an axially disposed spout-receiving and aligning bore 36 having a counterbore 37 at its lower end.

Figure 3:
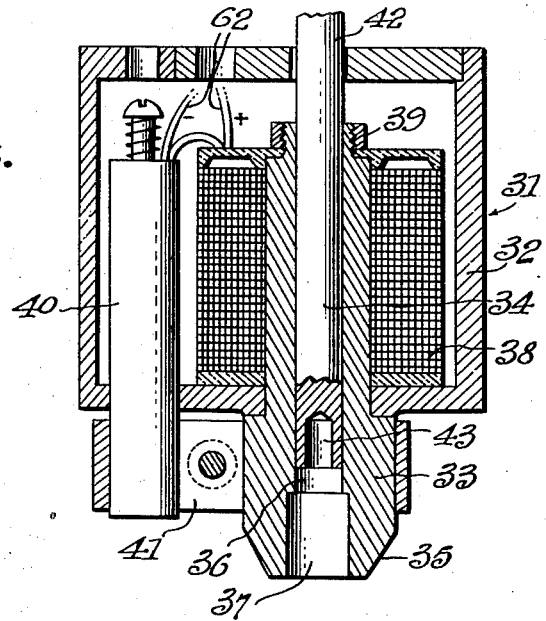
Figure 3 is a detail vertical cross-section taken on the line 3—3 on Figure 1.

The shank 34 of the iron extends into the casing chamber and is embraced by an electrical heating unit 38 secured thereto by a clamping nut 39 threadably engaged with the shank. A thermostat control unit 40 of any suitable type is provided for maintaining a definite temperature in each iron, and is disposed to one side of the respective heating unit 38 and has its lower end projecting below the bottom of the casing 32. A clamp 41 formed of heat conducting metal joins the lower end of each thermostat with the respective iron 33 to thereby provide for a flow of heat from the iron to the thermostat and also to maintain the thermostat in position, as shown in Figure 3.

Can spout stripping means are provided in each soldering iron assembly, and each said means includes a rod 42 slidably mounted in the respective iron bore 36 and having a short bore 43 in its lower end for receiving the upper end of a can spout. The upper end of each rod supports a weight 44 which causes the rod to gravitate in a manner serving to strip the spout from the bores 36, 37 after the soldering operation is completed.

Each soldering iron assembly 31 is slidably mounted on the turret portion 28, as at 45, for limited vertical adjustment. Each casing 32 is provided near its lower end with an inwardly extending lug 46. A vertically disposed captive screw 47, having a nut 48 secured thereon, is threadably engaged with each lug 46, and an opening 49 in the top of the turret over each screw 47 enables the insertion of a screw-driver for manipulating the screws. A leaf spring 50 is secured to each casing 32 and engages the respective nut 48 for yieldably retaining the elevating screw against rotation.

Figure 4:
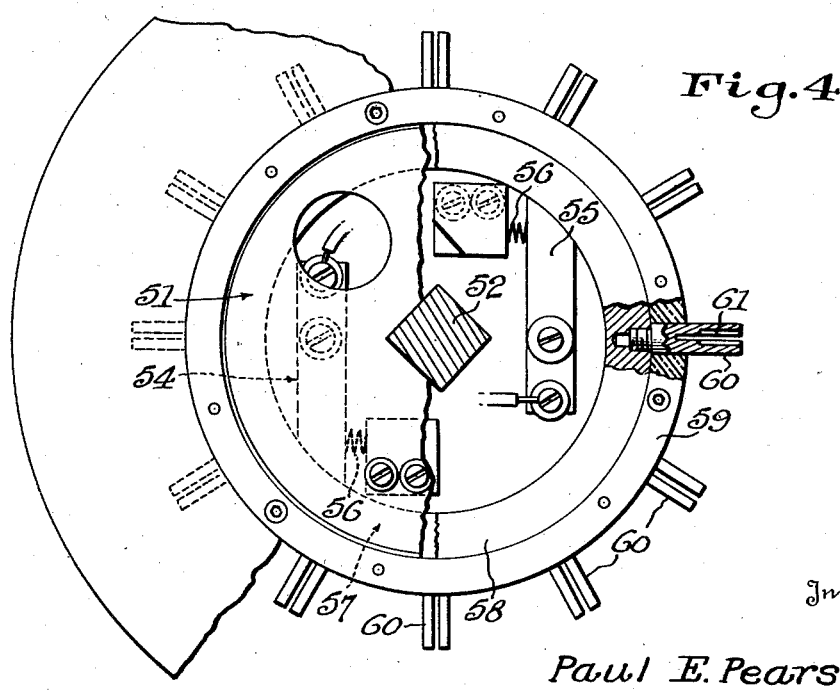
Figure 4 is a horizontal section taken on the line 4—4 on Figure 1.

In order that electricity can be supplied to the soldering iron assemblies when the apparatus is in operation, a contact ring assembly 51 is provided which permits a flow of electricity from the stationary portion of the machine to the rotating portion. The contact assembly 51 includes a squared stud 52 secured to the shaft 8 and extending upwardly therefrom. A disk 53 is mounted on the stud 52 and supports a pair of pivotally mounted metal contacts 54, 55. The contact 55 is disposed in a plane above that of the contact 54. The contacts 54, 55 are yieldably urged, as by springs 56, into individual contact with the respective upper and lower metallic contact rings 57, 58 which are in turn secured to the inner periphery of an annulus 59 formed from non-conducting material and secured to the upper turret portion 28. A plurality of upper and lower contact sockets 60, 61 are radially disposed around the annulus 59 and serve as means for conducting current from the contact rings 57, 58 to the exterior of the annulus. Electrical conductors 62 having plug connections 63 with the sockets 60, 61 lead to the heating and control elements of the soldering iron assemblies 31, the thermostat units 40 being connected in series with the respective iron heating elements in the manner illustrated in Figure 3. Electricity is supplied by suitable conductors attached to the contacts 54, 55. See Figure 4.

It is to be understood that any approved means can be employed for feeding solder to the irons, but there is herein disclosed a preferred form of such means. The particular solder feeding means herein disclosed, however, does not form a part of the invention claimed herein but is claimed in the parent application of Paul E. Pearson hereinbefore referred to, namely, Serial No. 244,085, filed December 5, 1938, and for this reason this solder feeding means will be referred to only briefly herein.

The mechanism for feeding predetermined amounts of solder to the irons as they are presented at the soldering station by the turret structure, carrying them in suitable superposed relation with the cans and assembled spouts, is disposed to one side of the turret structure assembly and includes a vertically extending telescopic shaft casing 64 terminating at its upper end in a chamber forming casing enlargement 65. A shaft 66 is journaled in the casing and carries a bevel gear 67 secured at its lower end which meshes with a similar gear on the main drive shaft 17. At its upper end the shaft 66 is connected in driving relation, through an eccentric and strap connection 68, with a slide 69 which is reciprocated in a rectilinear path toward and from the turret structures hereinbefore described.

The casing 65 is equipped with arm extensions 70 between which are supported gear-connected, coacting solder feeding rolls 71 between which a strip of solder S is directed from the supply roll 72 which is supported above the casing 65 in the manner illustrated in Figure 1 of the drawings. The solder strip, fed predetermined amounts through the rolls 71 in a manner soon to be described, is directed through a suitable delivery or guide tube 73 against the coniform nose portion 35 of the irons 33 as they are serially presented at the soldering station. One of the rolls 71 is equipped with a driving ratchet 74, and the slide 69 carries a pivotally mounted bell crank pawl member 75, the effective arm of which is normally disposed out of engagement with the ratchet. The slide also supports a casing 76 in which an actuator rod 77 is slidably mounted and extends beyond the casing at one end for engagement with a can disposed in position for a soldering operation and at its other end for engagement with the shaft casing 64. The rod 77 has slip connection, as at 78, with the downwardly extending leg of the pawl 75 so that each time the slide moves away from the turret structure the rod 76 is engaged with the casing 64 to displace the pawl from effective engagement with the ratchet, and each time the slide moves toward the turret structure and the rod 77 engages a can positioned for a soldering operation the pawl will be placed into effective engagement with the ratchet by arresting of movement of the rod by this can contact and continued movement of the slide will cause the pawl to impart solder strip feeding movements to the rolls 71. Since the pawl 75 normally reciprocates back and forth with the slide 69 out of position for effectively engaging the ratchet and is placed in effective contact with the ratchet only when the rod 77 engages a can positioned for a soldering operation, it will be apparent that no solder will be fed unless a can is presented for a soldering operation.

In using the herein described apparatus, the spouts are first manually dipped into soldering flux and then applied to the cans to complete the assembly. Then the can and spout assemblies are manually or otherwise fed onto the individual supports from the supporting table 79, and thence serially to and from the soldering station, after which they may be automatically discharged as by an ejecting cam 80 into a receptacle or onto a discharge conveyor provided for the purpose.

The machine herein disclosed may be hand-fed and cam-stripped as stated, or there may be combined with it any suitable form of mechanical feeding and discharging mechanism, an example of which may be found in the United States Letters Patent to Coyle et al. 1,885,992, issued November 1, 1932.

It is of course to be understood that the details of structure and arrangement of parts may be variously changed and modified without departing from the spirit and scope of the invention.

I claim:

1. In a machine of the character described, a turret structure comprising a soldering iron supporting member and a can supporting member rotatable about a common axis, means for positively moving said members along said axis to vary the spacing thereof, soldering irons individually-adjustably mounted on said iron supporting member for movement toward or from said can supporting member, and means for positively moving each iron on its adjustable mounting, said last named means including a lug extending from each iron and equipped with a threaded bore, and a captive screw threaded through each lug and effective when rotated in one direction or the other to impart movement of adjustment to the respective iron.

2. In a machine of the character described, a turret structure comprising a soldering iron supporting member and a can supporting member rotatable about a common axis, means for positively moving said members along said axis to vary the spacing thereof, soldering irons individually-adjustably mounted on said iron supporting member for movement toward or from said can supporting member, and means for positively moving each iron on its adjustable mounting, said last named means including a lug extending from each iron and equipped with a threaded bore, and a captive screw threaded through each lug and effective when rotated in one direction or the other to impart movement of adjustment to the respective iron, a non-circular element on each screw, and means yieldably engaging each said non-circular element to prevent inadvertent rotation of the respective screw.

PAUL E. PEARSON.

REFERENCES CITED

The following references are of record in the file of this patent:

UNITED STATES PATENTS

| Number | Name | Date |
|---|---|---|
| 421,043 | Brooks | Feb. 11, 1890 |
| 443,749 | Dewey | Dec. 30, 1890 |
| 523,091 | Wagner | July 17, 1894 |
| 689,056 | Besse | Dec. 17, 1901 |
| 779,526 | Cerruti | Jan. 10, 1905 |
| 862,493 | Marshall | Aug. 6, 1907 |
| 908,373 | Ayars | Dec. 29, 1908 |
| 931,262 | Brookes | Aug. 17, 1909 |
| 1,131,726 | Musher | Mar. 16, 1915 |
| 1,193,647 | Westland | Aug. 8, 1916 |
| 1,264,844 | Norton et al. | Apr. 30, 1918 |
| 1,367,407 | McClurkin | Feb. 9, 1920 |
| 1,502,773 | Gueritey | July 29, 1924 |
| 1,600,467 | Gray | Sept. 21, 1926 |
| 1,885,992 | Coyle et al. | Nov. 1, 1932 |
| 1,891,851 | Troyer et al. | Dec. 20, 1932 |
| 1,929,339 | Troyer et al. | Oct. 3, 1933 |
| 2,101,445 | Moore | Dec. 7, 1937 |
| 2,167,654 | Hothersall | Aug. 1, 1939 |